United States Patent [19]

Radici et al.

[11] 3,979,479
[45] Sept. 7, 1976

[54] BLOCK COPOLYMERS

[75] Inventors: Pierino Radici, Turate (Como);
Gaudenzio Bianchi, Fagnano Olona (Varese); Daniele Colombo, Castellanza (Varese); Paolo Colombo, Saronno (Varese), all of Italy

[73] Assignee: Societa' Italiana Resine S.I.R. S.p.A., Milan, Italy

[22] Filed: Dec. 16, 1974

[21] Appl. No.: 533,267

[30] Foreign Application Priority Data

Dec. 28, 1973 Italy................................. 32344/73

[52] U.S. Cl............................................. 260/857 F
[51] Int. Cl.² ....................................... C08L 77/02
[58] Field of Search................................ 260/857 F

[56] References Cited
UNITED STATES PATENTS 3,555,514  11/1967  Van De Walle................. 260/857 F
3,592,873  7/1971  Ishida............................ 260/857 F

*Primary Examiner*—Murray Tillman
*Assistant Examiner*—W. C. Danison, Jr.
*Attorney, Agent, or Firm*—Flynn & Frishauf

[57] ABSTRACT

A novel block copolymer HO—D—A—B—D—H, wherein
  A is a polylactonic block of recurring units

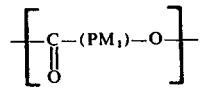

B is a polylactamic block of recurring units

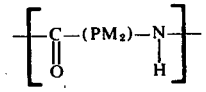

C is a polyoxymethylene block of recurring units

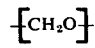

is prepared by catalytic polymerization of at least one lactone

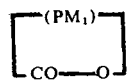

with at least one lactam

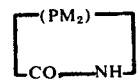

wherein:
  $PM_1$ and $PM_2$ are polymethylene linear chains having from 2 to 13 and 3 to 13 carbon atoms, respectively, and being either non-substituted or having at least one hydrogen atom replaced by an alkyl, aryl, alkylaryl or cycloalkyl radical, and reaction of the resulting A-B copolymer with monomeric formaldehyde.

The block copolymer HO—D—A—B—D—H having a preponderant percentage in blocks A, B or D, respectively, behaves as a polylactone, polylactam or polyformaldehyde, respectively, having improved properties.

14 Claims, No Drawings

BLOCK COPOLYMERS

RELATED APPLICATIONS

This application is related to application Ser. Nos. 533,268, 533,269 and 533,316, all filed Dec. 16, 1974.

The invention relates to a novel block copolymer and a process for the manufacture thereof.

Lactam-lactone block copolymers are known in the art, which can be defined by the general formula:

in which A stands for a polylactonic block and B for a poly lactamic block.

It has now been found that it is possible to graft on the said lactam-lactone copolymer two polyoxymethylene blocks thereby producing a novel and useful polymeric product.

An object of the invention is to provide a novel block copolymer comprising polylactonic, polylactamic and polyoxymethylene blocks chemically bonded with one another.

A further object of the invention is to provide a method for preparing the said block copolymers.

The block copolymers of the invention can be defined by the following general structure:

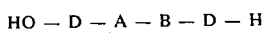

wherein:

— A is a polylactonic block consisting of recurring units:

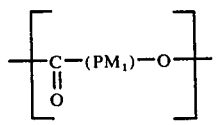

obtainable from one or more monomeric lactones of the general formula:

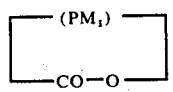

wherein $PM_1$ is a linear polymethylene chain having from 2 to 13 carbon atoms, non substituted or having at least one hydrogen atom replaced by an alkyl, aryl, alkylaryl or cycloalkyl radical.

The preferred lactones for the purposes of the invention are: ε-caprolactone, δ-valerolactone, β-propiolactone, pivalolactone and ω-enanthiolactone.

— B is a polylactamic block consisting of recurring units:

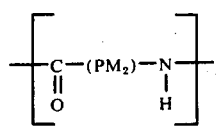

obtainable from one or more monomeric lactams of the general formula:

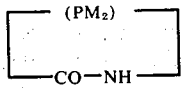

wherein $PM_2$ is a linear polymethylene chain having from 3 to 13 carbon atoms, non substituted or having at least— one hydrogen atom replaced by an alkyl, aryl, alkylaryl or cycloalkyl radical.

The preferred lactams for the purposes of the invention are: ε-caprolactam, α-pyrrolidone, ω-lauryllactam, α-piperidone and ω-enanthiolactam.

— D is a polyoxymethylene block of recurring units:

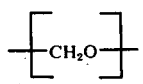

the blocks D being present in a proportioon of from 5 to 99.9% by weight in the said block copolymer.

The copolymers therefore comprise four homogeneous blocks, which are joined by chemical bonds of covalent type.

In the following description:
— the block copolymers of the invention shall be referred to as "copolymer D—A—B—D",
— the lactone-lactam block copolymers, mentioned above, shall be referred to as "copolymer A—B",
— the term "group-A—B" shall denote the whole of the two polylactonic and polylactamic blocks being part of the copolymers D—A—B—D,
— by "block A" and "block B" shall be understood the polylactonic and the polylactamic blocks, respectively, either in the copolymers D—A—B—D or in the copolymer A—B or in the group A—B-
"block D" shall denote the polyoxymethylene blocks in the copolymers D—A—B—D.

The block copolymers D—A—B—D of the invention are preferably used when the group -A—B— has a molecular weight from 1,000 up to 50,000, and when the block A is present in the said group —A—B— in a proportion of from 1 to 89% by weight. 1% by weight of block A in the group —A—B— is actually the minimum proportion adapted to modify the properties of the block B. On the other hand, 11% by weight of block B in the group —A—B— represents the minimum proportion adapted to modify the properties of block A.

Similarly, the minimum proportion of blocks D in the copolymers D—A—B—D, adapted to modify the properties of the group —A—B—, is of 5% by weight.

Finally, the minimum proportion of the group —A—B— in the copolymers D—A—B—D adapted to modify the properties of the blocks D is of 0.1% by weight.

Therefore, the copolymers D—A—B—D of the invention contain the blocks D in a proportion of from 5 to 99.9% by weight.

The preferred uses of the copolymers D—A—B—D of the invention should be mainly connected with their compositions, though still remaining within the above-defined ranges.

Thus, e.g., the copolymers D—A—B—D rich in block B are particularly useful in the field of yarn and thread and moulded products.

The copolymers D—A—B—D rich in blocks D are particularly useful as technopolymers for special uses as substitutes for metals.

Finally, the copolymers D—A—B—D rich in block A are particularly useful as special additives for plastics.

The copolymers D—A—B—D of the invention are prepared by a process essentially comprising the steps of:
— preparing the copolymer A—B by catalytic polymerization of the aforesaid lactone and lactam monomers at a first reaction stage.
— purifying the resulting copolymer A—B in order to make it suitable for the subsequent reaction with formaldehyde.
— preparing the block copolymer D—A—B—D by reacting the copolymer A—B with monomeric formaldehyde in a liquid reaction medium at a second reaction stage.

Moreover, according to a preferred embodiment of the process of the invention, the copolymer D—A—B—D obtained at the second reaction stage, is stabilized by converting to stable groups its unstable terminal hydroxyl groups.

PREPARATION OF THE COPOLYMER A—B

According to the invention, a copolymer A—B is first prepared by polymerizing the said lactone and lactam monomers.

The said polymerization is generally carried out in the presence of an anionic catalyst consisting of a metal derivative of a lactam.

More particularly, the said metal derivative of a lactam has the following structure:

$$\left[ \left[ \begin{array}{c} -(PM_2)- \\ -CO-N- \end{array} \right]^{-} \right]_Z Me^{Z+}$$

wherein Me stands for an alkali or alkaline earth metal, Z is 1 or 2 and $PM_2$ is the hereinbefore defined chain. The preferred alkali metals are lithium, sodium and potassium, calcium being the preferred alkaline earth metal.

The polymerization medium can be admixed with the preformed catalyst, namely in the form of a metallic derivative of a lactam.

For practical reasons, the alkali or alkaline earth metal is preferably supplied to the reaction medium, and the metallic derivative of the lactam is formed in the said medium.

The copolymer A—B is advantageously prepared in an anhydrous atmosphere in the absence of oxygen.

The polymerization temperature can vary within a very wide range, generally from −30° to 300°C, the best suited temperature being selected within the said range of values, depending upon each individual case.

Accordingly, the polymerization period can range from 1 minute to 10 hours.

In any case, a proportion of catalyst of from 0.1 to 10 moles to 100 moles of the monomer charge is conveniently employed.

Finally, the copolymerization of the lactam and lactone monomers can be carried out by the suspension technique (that is in a diluent non-solvent for the A—B copolymer), by the solution technique (that is in a solvent for the A—B copolymer) or in the absence of solvent and thinner.

Copolymerization of the lactam and lactone monomers in the absence of solvent and diluent In a first reaction stage carried out in the absence of solvent and diluent (i.e. in block or molten condition), the reaction conditions are adjusted depending upon the monomers, their ratio and the particular catalyst selected.

The reaction temperature can vary within a very wide range, more particularly from −20°C to 300°C. Moreover, the ratio of the monomers charged depends upon the desired composition of the copolymer A—B, considered also the different reactivity of the monomers. The polymerization period can generally range from 1 minute to 4 hours, a period of from 10 to 100 minutes being conveniently adopted.

A temperature higher or lower than the melting point of the forming copolymer A—B can be adopted, such as for instance in the case of the copolymerization of ε-caprolactam with ε-caprolactone. In certain cases, however, a temperature higher than the melting point of the copolymer A—B is preferably employed, inasmuch as a higher polymerization rate is obtained.

More particularly, by polymerizing at 180°C ε-caprolactone and ε-caprolactam in a molar ratio of ε-caprolactam to ε-caprolactone of 7.5:2.5 and with sodium-caprolactam as catalyst, for a period of 0.5 hours and with a practically quantitative yield (exceeding 97%), a copolymer A—B is obtained which melts at 169.5°C and has a reduced viscosity of 1.3 liters.g⁻¹.

In the following, the A—B copolymer viscosity will be always measured at 35°C from a solution of metacresol containing 0.2% by weight A—B copolymer and expressed as the ratio $$\eta \text{ reduced} = \frac{\eta \text{ specific}}{\text{concentration}}$$

in liters.g⁻¹.

In certain cases, it is possible to polymerize only at a temperature exceeding the melting point of the forming copolymer A—B and in other cases only at a temperature below the melting point of the copolymer A—B.

Thus, when polymerizing lauryllactam with ε-caprolactone, in a molar ratio of 9:1 at a temperature of 200°–230°C, with the corresponding metal-lactam, a colourless copolymer A—B is obtained with a yield exceeding 90% and a reduced viscosity of 1.1 liters.g⁻¹.

Moreover, by polymerizing alpha-pyrrolidone with δ-valerolactone, in a molar ratio of 9:1 at a temperature of 30°–40°C and with lithium-lactam as a catalyst, a copolymer A—B of a reduced viscosity of 1.4 liters.g⁻¹ is obtained in 1.5 hours with a 97% yield.

Suspension copolymerization of the lactam and lactone monomers

When copolymerizing lactam and lactone monomers by the suspension technique, the reaction conditions also vary as a function of the monomers, the ratio thereof, the selected catalyst and the type of diluent.

The diluent employed can be any liquid substance, non-solvent for the copolymer A—B at the polymerization temperature and inert (non-reactive) towards the further substances present in the reaction medium.

Generally, the diluent is chosen among organic substances of the aromatic hydrocarbon type such as toluene or xylene, aliphatic hydrocarbons such n-heptane or other paraffins, cycloaliphatic hydrocarbons or substances of the dimethylformamide and dimethyl sulphoxide type.

The reaction temperature can vary within a wide range, such as from −30° to 280°C.

The temperature is preferably maintained below the melting point of the forming copolymer A—B, inasmuch as if the copolymer A—B is melted, a stirrer of a special type should be employed. Accordingly, the reaction period can range from 5 minutes to 10 hours.

In every case, when effecting a suspension polymerization, the temperature is adjusted so as to avoid solubilization phenomena of the copolymer A—B in the diluent employed.

In suspension copolymerization of $\epsilon$-caprolactam with $\epsilon$-caprolactone, a temperature exceeding about 40°C is conveniently employed. Thus, e.g., when the two monomers are in a molar ratio 9:1 (lactam:lactone), optimum results are obtained by polymerizing at about 140°C, in a toluene suspension with a potassium-lactam catalyst present in a proportion of 2 moles to 100 moles monomers.

In suspension copolymerization of $\alpha$-pyrrolidone with $\epsilon$-caprolactone, a temperature from −30° to 100°C, preferably from 0° to 40°C is conveniently adopted. Thus, e.g., when the two monomers are present in a molar ratio of 1:1, optimum results are obtained by polymerizing at 20°C, in a n-heptane suspension, sodium-lactam being employed as catalyst in a proportion of 3 moles to 100 moles monomers. Under these conditions a conversion of the monomers to the corresponding copolymer A—B of 74% is obtained after 4 hour reaction.

Solution copolymerization of the lactam and lactone monomers

In solution copolymerization of the lactam and lactone monomers, the choice of the solvent as well as of the other factors is bound to the solubility of the forming copolymer A—B in the solvent.

On the other hand, the solubility of the copolymer A—B varies as a function of its molecular weight as well as a function of its composition.

Therefore, a given solvent implies an accurate dissolution temperature for a copolymer A—B having a given molecular weight, said temperature varying as a function of the copolymer composition.

Thus, e.g., the copolymer obtained from $\alpha$-pyrrolidone and $\delta$-valerolactone in a molar ratio of 60:40 is insoluble in dimethylformamide at 30°C, whereas, when the molar ratio is 30:70, the corresponding copolymer is soluble at said temperature in the said solvent. The copolymers A—B formed from the other lactams and lactones behave in a similar manner.

In every case, the suitable solvent is chosen among organic substances, which are liquid at the polymerization temperature, inert (non-reactive) towards the other constituents of the reaction medium and of a polar nature, such as, e.g., dimethylformamide, dimethyl acetamide and dimethyl sulphoxide.

It is at times possible to employ a mixture of such a substance with aliphatic or aromatic liquid hydrocarbons.

When operating in solution, the polymerization temperature can generally vary from 0° to 200°C, and the corresponding reaction period can vary from 5 minutes to 6 hours.

Thus, e.g., dimethylformamide was found useful as a solvent in the solution polymerization of $\epsilon$-caprolactam with $\epsilon$-caprolactone at a temperature exceeding the limit of solubility of the copolymer A—B being formed.

Dimethyl sulphoxide can be employed as a solvent in the copolymerization of $\epsilon$-caprolactam with $\epsilon$-caprolactone.

The said monomers in a lactam-lactone molar ratio of 9.5:0.5 can be copolymerized in dimethyl acetamide at 140°C employing a lithium-lactam as catalyst. Under these conditions, after 3.5 hours the monomers conversion is of 86.4%, and the resulting copolymer A—B can be precipitated by cooling the solution.

The copolymer A—B can be formed, in addition to the polymerization in solution, in suspension or in the absence of solvent, by utilizing mixed techniques.

For instance, solution copolymerization can be carried out up to the limit of solubility of the forming copolymer A—B in the solvent, followed by suspension copolymerization.

Going over from the solution to the suspension technique may further be effected by lowering the temperature during the progress of the reaction or by adding to the reaction medium a non-solvent for the copolymer A—B.

TREATMENT OF THE COPOLYMER A—B

The copolymer A—B prepared by the described technique should be submitted to a treatment adapted to make it suitable for the subsequent reaction with formaldehyde.

The treatment essentially consists in purifying the copolymer A—B containing the catalytically active nuclei in the macromolecular chain.

Preferably, the A—B copolymer is brought to a particulate form during or possibly before said purification treatment, inasmuch as the copolymer A—B is then in a physical form suitable for its subsequent reaction with formaldehyde.

More particularly, the copolymer A—B obtained at the first reaction stage is purified in order to remove the unreacted monomers, the lactone homopolymer, or copolymer not bonded to the unit B, the free catalytic residues (not chemically bonded to the macromolecular chain of the polymer A—B) and the other possible impurities. Special care should be taken in removing the free catalytic residues which would otherwise lead to the formation of homopolymers of formaldehyde in the second stage polymerization.

Purification can be carried out by dissolving the copolymer A—B in a solvent, followed by precipitation and washing of the copolymer A—B. Suitable solvents for such treatment are those in which the impurities are highly soluble and which do not destroy the catalytically active nuclei bonded to the macromolecular chain. Generally, the solvent is chosen among the following general classes: chlorinated aliphatic hydrocarbons, aromatic hydrocarbons, chlorinated aromatic hydrocarbons, nitrogenous aromatic derivatives, amides, sulphoxides, and others. Examples of such solvents are: nitrobenzene, chlorobenzene, toluene, xylene, dimethylformamide and dimethyl sulphoxide.

According to an embodiment of the process of the invention, the copolymer A—B is dissolved in the solvent at a temperature from 0° to 200°C. The copolymer A—B is then precipitated by cooling the solution and- /or adding a non-solvent for the copolymer A—B. Particularly suitable non-solvents for this purpose are aliphatic hydrocarbons, such as hexane, heptane, octane and others. The copolymer A—B is then filtered and washed by the above-described solvent till the impurities are no longer present in the filtrate. The latter steps can be carried out at room or higher temperature.

The copolymer A—B can be utilized at the second polymerization stage in the form of a solution or, preferably, in the form of a suspension in a diluent. In the latter case, the copolymer A—B should be in an extremely finely subdivided form in order to promote contact of its active nuclei with the formaldehyde. For this reason, when the A—B copolymer forms a precipitate, the conditions are advantageously so adjusted that the copolymer A—B is in the form of particles 1 to 100 microns in size.

The copolymer treatment being discussed can take particular aspects depending upon whether the copolymer A—B is the result of solution or suspension polymerization or of polymerization in the absence of diluents and solvents. Thus, e.g., in the case of bulk polymerization or polymerization in a molten state, the copolymer A—B is conveniently pulverized and dissolved in a suitable solvent. The copolymer A—B is then precipitated and washed. These steps can be repeated several times.

The copolymer A—B obtained by the suspension technique is normally in a suitable physical form for the subsequent second stage polymerization. At times it may be sufficient to filter the suspension and throughly wash the solid for separating undesirable impurities.

The copolymer A—B obtained by the solution technique is normally precipitated by cooling and/or adding a non-solvent for the copolymer A—B, followed by filtering and washing.

it will be clear from the above discussion that the first reaction stage is preferably carried out by the suspension or solution technique, inasmuch as the impurities remain solubilized at least in part in the diluent or solvent. Therefore, the dissolution of the copolymer A—B in a solvent and/or its precipitation are at times not necessary. In this case, it is decidedly preferable to carry out the first reaction stage by the suspension technique, inasmuch as then A—B copolymer is the present in a finely subdivided form suitable for its subsequent reaction with the formaldehyde.

PREPARATION OF THE COPOLYMER D—A—B—D

According to the process of the invention, the copolymer A—B obtained from the previously described treatment is contacted with monomeric formaldehyde at a second polymerization stage in order to form the copolymer D—A—B—D.

To this end, the copolymer A—B is preferably dissolved in a solvent or suspended in a diluent and contacted with gaseous formaldehyde or with a solution of formaldehyde in an organic solvent.

Solvents useful for the copolymer A—B are those previously described. The diluent can be chosen among the organic compounds belonging to the following general classes: aromatic hydrocarbons, aliphatic hydrocarbons, cycloaliphatic hydrocarbons, ethers and the like. Examples of such diluents are: heptane, toluene, cyclohexane and ethyl ether.

In any case, the said solvent or diluent should not interfere with the active nuclei of the copolymer A—B and should be inert (non-reactive) towards the further constituents of the reaction medium.

In the second reaction stage, the range of temperature can be very wide such as from −70°C to 100°C, though a value from −20°C to 80°C is preferably adopted. The formaldehyde employed is advantageously of high purity and anhydrous. A suitable formaldehyde can be obtained, e.g., by the purification processes disclosed by U.S. Pat. Nos. 3,118,747 and 3,184,900.

In the second reaction stage, the order of addition of the reagents is not essential. Thus, e.g., the copolymer A—B can be added in solution or suspension form to a solution of the formaldehyde in the organic solvent. It is also possible to simultaneously add into a reaction medium the solution or suspension of the copolymer A—B and the gaseous formaldehyde or formaldehyde solution. In the preferred embodiment, gaseous formaldehyde is supplied to the solution or suspension of the copolymer A—B, the process being carried out continuously. This can be effected by continuously supplying the formaldehyde and copolymer A—B to a stirred reactor following, for instance, the polymerization technique disclosed by U.S. Pat. No. 3,458,479 in respect of the formation of the formaldehyde homopolymers.

The quantity of formaldehyde supplied depends upon the size of the blocks D to be grafted on the copolymer A—B, further considering that, under the described conditions, a practically total polymerization of formaldehyde occurs.

In every case, on completion of the second stage polymerization, a suspension containing up to 50% by weight of the copolymer D—A—B—D is obtained.

A peculiar feature of the process of the invention is the production of a highly fluid suspension of the copolymer D—A—B—D, even at a high concentration of the latter in the reaction medium. The resulting copolymer D—A—B—D is submitted to purification treatments essentially in order to remove any unaltered copolymer A—B and the catalytically active nuclei.

To this end the suspension of the copolymer D—A—B—D is filtered, the resulting solid being washed. More particularly, solvents of the previously mentioned type and capable of solubilizing the unaltered copolymer A—B are employed for said washing.

The decomposition and removal of the catalytically active nuclei takes place with a protonic polar solvent such as, e.g., an alcohol or a weak organic acid.

These treatments can be effected at room temperature or higher temperature such as up to 100°C.

The copolymer D—A—B—D is finally dried generally at a temperature of from 20° to 60°C and at subatmospheric pressure.

The copolymer D—A—B—D is thus recovered in the form of a compact homogeneous powder of a high bulk density, generally of the order of 0.5 kg/liter.

STABILIZATION OF THE COPOLYMER D—A—B—D

The copolymer D—A—B—D of the invention possesses two blocks D which carry at their ends thermally unstable hydroxyl groups.

It is therefore convenient to convert the said hydroxyl groups to further more stable groups, such as, e.g., ester, ether or urethane groups.

To this end, the copolymer D—A—B—D can be contacted with a reagent such as an anhydride of a carboxylic acid (generally acetic anhydride) for the esterification, or such as an orthoester, epoxide or acetal for the etherification, or, finally, with a substance containing isocyanate or isothiocyanate groups for the conversion to urethane or thiourethane groups.

The hydroxyl groups conversion can be carried out in a way similar to that known in the art for blocking the unstable hydroxyl groups of the polyoxymethylene.

Thus, e.g., the reagent can be contacted with the copolymer D—A—B—D dissolved or suspended in a liquid reaction medium.

In a preferred embodiment, the copolymer D—A—B—D is suspended in a liquid reaction medium comprising a solvent for the copolymer D—A—B—D and a non-solvent for the latter, the said solvent and non-solvent being thoroughly miscible at the reaction temperature, but being immiscible or but little miscible at a temperature below the reaction temperature, such as at room temperature. A technique of this kind is disclosed in Italian patent application No. 32,947 of Dec. 27, 1971, now Italian Pat. No. 946,165.

It is further possible to operate in the absence of solvent or diluent by contacting the liquid or gaseous reagent with the solid copolymer D—A—B—D.

In every case, when stabilizing the block copolymer, a temperature in the range from 60° to 200°C (preferably from 120° to 170°C) and a period of from 1 to 120 minutes are adopted.

The solvent or diluent used in the said conversion can be selected in the following classes of compounds: aliphatic hydrocarbons, aromatic hydrocarbons, sulphoxides, ethers, ketones, esters and others.

A catalytic compound can be used in the stabilization reaction. This catalyst is of the type utilized in the art for stabilizing polyoxymethylenes.

COPOLYMER D—A—B—D

As previously stated, the block copolymer of the invention has a structure HO—D—A—B—D—H wherein A is the polylactonic block, B the polylactamic block and D the polyoxymethylene block.

This structure is warranted both by considerations relating to the reaction mechanism and by analytical data. More particularly, in respect of the considerations relating to the reaction mechanism it is known that, when polymerizing lactamic and lactonic monomers in the presence of an anionic catalyst, a copolymer A—B is obtained, in which A is the polylactonic unit and B is the polylactamic unit.

On completion of the polymerization reaction, the raw copolymer A—B possesses two ionic couples on the lactamic and lactonic part, respectively. In this connection, a number of research works have been carried out such as appears from MAKROMOLEKULARE CHEMIE 115 (1968) pages 33–42, 127 (1969) pages 34–53, 89 (1965) pages 27–43, FORTSCHRITTE DER HOCHPOLYMEREN FORSCHUNG, 2 (1961) pages 578–595 and others.

These ionic couples give rise to the polymerization of formaldehyde and to the production of a copolymer D—A—B—D in which two blocks D are bonded to the copolymer A—B.

Production of the copolymer D—A—B—D is made possible by the use of solvents, diluents and reagents of particular purity in order to set up typical conditions for the growth of the living polymer.

In addition to the preceding considerations, the composition of the copolymer D—A—B—D of the invention is confirmed by the following analytical tests:
— the elementary test (carbon, hydrogen and nitrogen) confirmed the reaction and extraction balances.
— the presence of the blocks A, B and D is determined by gaschromatographic-pyrolytical analysis.
— on infra-red analysis of the unstabilized copolymer D—A—B—D, the presence of the NH vibration band at 3310 $cm^{-1}$, of the OH vibration band at 3420 $cm^{-1}$, of the band of the lactonic CO at 1740 $cm^{-1}$, of the band of the lactamic CO at 1640 $cm^{-1}$, and of a band at 1660–1670 $cm^{-1}$ is ascertained, the latter band being assignable to the vibration of the lactamic CO displaced upon substitution on the nitrogen.
— The presence of the blocks A, B and D was confirmed by nuclear magnetic resonance analysis.
— The differential thermal analysis always showed a single fusion peak for the copolymer D—A—B—D on variation of the percentage of blocks D in the copolymer and on variation of the lactone percentage in the group —A—B—.

The corresponding blend of formaldehyde homopolymer and of the copolymer A—B exhibits at least two fusion peaks relating to the fusion the formaldehyde homopolymer and to the fusion of the copolymer A—B, respectively. It should be noted that the fusion peak of the copolymer A—B can be split up at critical values of the composition. Thus, with a high lactone percentage the peak relating to the melting of unit A appears. However, at the fusion peak regions, no decomposition was ever ascertained, which might have interfered with the fusion. Decompositions start in fact at temperatures higher than the melting point.

Moreover, the latent heat of fusion of the blend, determined by differential thermal analysis, corresponds rather truly to the value calculated from both polyformaldehyde homopolymer and copolymer A—B.

This value does not apply to the corresponding copolymer D—A—B—D the latent heat of fusion of which is lower than that calculated in theory. This difference shows that an influence is exerted upon the crystallization of the block D, this influence being due to the presence of the A—B group directly bonded to the blocks D.

The infra-red analysis of the copolymer D—A—B—D stabilized by acetylation of the terminal hydroxyl groups shows that the OH band disappears and that the CO band of the acetyl ester appears.

A further test relating to the structure of the copolymer D—A—B—D is as follows:

The copolymer D—A—B—D is stabilized by controlled etherification without any interference with the other components of the macromolecular chain.

The copolymer D—A—B—D thus stabilized is subjected to an alkaline hydrolysis under controlled conditions so as to effect the hydrolysis of the ester groups of the block A. On completion of the alkaline treatment, an aqueous solution of a lactonic oxyacid plus a powder of a polymeric substance are obtained.

After washing the latter with water and drying, it is fractionated on a column filled with Celite (R.T.M.) as a support.

20 fractions are obtained, the first seven of which consisting (on elementary and infrared test) of polyformaldehyde alone.

The three following fractions have a variable nitrogen content. The last 10 fractions contain almost constant quantities of nitrogen. The elementary, infrared and nuclear magnetic resonance analyses showed the presence in the last fractions of D and B blocks.

each copolymer D—A—B—D the properties of which are summarized in Table 1, has been stabilized by acetylation of the terminal hydroxyl groups.

The determinations in Table 1 have been carried out conventionally according to the ASTM methods.

Table 1

|  | 1 | 2 | 3 | 4 | 5 | 6 |
|---|---|---|---|---|---|---|
| Tensile strength: kgs/sq.cm. | 650–750 | 750 | 400–770 | 700 | 300–400 | 210–280 |
| Elongation % | 80–200 | 200 | 70–120 | 60 | 150–300 | 500–1,000 |
| Impact strength Izod with notch: Kgs.cm/sq.cm | 12–20 | 20 | 14–20 | 12 | — | — |
| Density:g/ml | 1.13–1.20 | 1.12 | 1.25–1.43 | 1.42 | 1.15–1.30 | 1.149 |
| Coefficient of linear expansion: m/m.$10^{-5°C}$ | 9 | 12 | — | — | — | — |
| Moisture absorption: % by weight | 1.17 | 1.6 | — | — | — | — |
| Flammability: mm/min | — | — | 10–25 | 25 | — | — |
| solubility in benzene at room temperature (20–25°) | — | — | — | — | insoluble | insoluble |

The physical-mechanical, optical, electrical and application properties of the copolymer D—A—B—D of the invention depend upon its composition and molecular weight in addition to the particular monomers selected. It is therefore impossible to define a single set of properties, whereas indicative values can be given in respect of each homogeneous composition range.

In Table 1, column 1 summarizes the properties determined on samples from a copolymer D—A—B—D of $\epsilon$-caprolactam, $\epsilon$-caprolactone and formaldehyde, containing 60 to 95% by weight block B, the remainder consisting prevailingly of blocks D.

The same Table indicates under column 2 the same properties determined on samples from a polycaprolactam.

A general improvement of the properties in the case of copolymer D—A—B—D is ascertained, especially a reduced moisture absorption (hence a higher dimensional stability) and improved self-lubricating properties.

It should be moreover noted that mixes cannot be formed from polyformaldehyde and copolymers A—B.

Table 1 indicates under column 3 the properties determined on samples from a copolymer D—A—B—D of $\epsilon$-caprolactam, $\epsilon$-caprolactone and formaldehyde, containing from 60 to 99.9% blocks D.

The Table indicates under column 4 the same properties determined on samples from acetylated polyformaldehyde.

With respect to the acetylated formaldehyde, the said copolymer D—A—B—D exhibits improved mechanical properties ((such as resiliency), an improved dyeing attitude (particularly useful in the case of fibers), an improved chemical and thermal stability and improved coating and self-extinguishing properties.

Therefore, the copolymer D—A—B—D having a composition within the said range can be considered as a modified polyacetal resin of improved properties.

Table 1 indicates under column 5 the properties determined on samples from a copolymer D—A—B—D of $\epsilon$-caprolactam, $\epsilon$-caprolactone and formaldehyde containing from 20 to 84.4% by weight block A.

The same Table indicates under column 6 the same properties determined on a polycaprolactone.

The improvements in the case of a copolymer D—A—B—D are apparent. It should be noted that In the following Examples, the parts and percentages are by weight unless otherwise specified.

EXAMPLE 1

Preparation of the copolymer A—B 75 parts pure $\epsilon$-caprolactam maintained at 100°C while stirring and in an inert atmosphere by means of a stream of pure nitrogen are admixed with 0.17 part sodium metal in finely subdivided condition in a 50% paraffin suspension. After 15 minutes residence, the reaction mixture is admixed with 25 parts pure $\epsilon$-caprolactone, while the temperature is raised to 180°C. These conditions are maintained during 25 minutes, whereupon 450 parts anhydrous dimethyl sulphoxide are added while vigorously stirring, and a clear solution is obtained. The temperature is lowered and the stirred mass is admixed with 600 parts toluene. Precipitation occurs at about 90°C, when the toluene concentration amounts to about 60%. The resulting suspension is cooled to room temperature. The precipitated copolymer is washed with anhydrous toluene by decanting so as to quantitatively remove the dimethyl sulphoxide.

The resulting suspension contains 10.7% copolymer A—B, the balance being toluene.

The analysis of the copolymer A—B shows the following results:

| | |
|---|---|
| % conversion of the monomers | = 97.2 |
| nitrogen percentage | = 9.26 |
| lactam percentage | = 74.74 |
| reduced viscosity | = 1.04 liters.$g^{-1}$ |
| melting point (°C) | = 168–170 |
| grain size (moist) = | |
| > 88 microns : 0.5% | |
| 88–40 microns : 93.2% | |
| < 40 microns : 6.3% | |

The suspension of the copolymer A—B in toluene is stored in a nitrogen atmosphere and can be employed for the subsequent reaction with the formaldehyde.

Preparation of the copolymer D—A—B—D

Pure gaseous monomeric formaldehyde is introduced in a quantity of 2.5 parts per minute through a dipping tube at the bottom of a polymerization reactor containing 1,000 parts toluene while vigorously stirring. Strictly controlled conditions in respect of the absence of moisture and air are maintained in the reactor by a suitable device and a nitrogen flow.

4 parts of the copolymer A—B (in a toluene suspension) are charged to the reactor before supplying formaldehyde.

The reactor is immersed into a water bath so as to maintain an inner temperature of 20°–25°C. Feed of gaseous formaldehyde is pursued during 80 minutes. Absorption of formaldehyde and polymerization are extremely quick, practically no unaltered formaldehyde issuing from the reactor.

On completion of the formaldehyde feed, the copolymer suspension is stirred during 10 minutes and filtered. The product is dried in an oven at 60°C and subatmospheric pressure, then subjected to continuous extraction during 20 hours with anhydrous methanol in a Soxlhet extractor.

The product is again dried and submitted to analysis which gave the following results:

| | |
|---|---|
| overall percentage of yield with respect to the feed | = 97 |
| nitrogen percentage | = 0.18 |
| percentage of the group -A-B- | = 1.94 |
| intrinsic viscosity | = 3.19 liters.g$^{-1}$ |

In the following, the D—A—B—D copolymer viscosity will be always measured at 60°C from a solution of p-chlorophenol with 2 wt.% α-pinene containing 0.5 wt.% D—A—B—D copolymer and expressed as the ratio $$\eta \text{ intrinsic} = \frac{\eta \text{ relative}}{\text{concentration}}$$

in liters.g$^{-1}$.

The analysis of the infrared spectrum shows the presence of the band of the —OH group at 3,460 cm$^{-1}$, of the band of the —NH group at 3,310 cm$^{-1}$, of the band of the lactamic C=O at 1,640 cm$^{-1}$ with an accentuated absorption at 1,660–1,670 cm$^{-1}$.

Bands at 4,425 and 2,020 cm$^{-1}$ relating to the oxymethylene chain are also present.

Stabilization of the copolymer D—A—B—D 100 parts of the copolymer D—A—B—D are submitted to acetylation under inert conditions in a reactor provided with a stirrer and containing a mixture of 100 parts pure acetic anhydride and 200 parts n-dodecane. The suspension is stirred during 20 minutes at 145°–150°C, the pressure in the reactor being so adjusted as to maintain the system at boiling temperature. The polymer is filtered and thoroughly washed first with toluene then with acetone. Drying is carried out in an oven at 60°C and subatmospheric pressure, 98.8 parts stabilized copolymer being recovered and analyzed.

The analytical data concerning the stabilized copolymer D—A—B—D do not show appreciable variations over those obtained before stabilization under the aspect of the intrinsic viscosity and of the contents of the group —A—B—. The infrared spectrum analysis shows, with respect to the analysis before stabilization, the disappearance of the band of the group —OH and the appearance at 1,750 cm$^{-1}$ of the band of the acetyl group.

The stabilized copolymer D—A—B—D is submitted to thermal degradation test ($K_{220}$) i.e. the weight loss per minute during the first 30 minutes at 220°C in nitrogen. The determination effected by a microbalance gives a value of $K_{220}$ of 0.009%.

The stabilized copolymer D—A—B—D is admixed in molten condition with 0.2% pentaerythritol tetra(beta-4'-hydroxy-3',5'-di-tert-butylphenyl)propionate, the properties summarized in Table 2 being determined after admixture with the additive.

EXAMPLE 2

30 parts of the copolymer A—B, prepared as described in Example 1 are supplied to a reactor containing 1,000 parts toluene, then reacted with formaldehyde in the manner described in Example 1 by supplying formaldehyde at a rate of 2.5 parts per minute during 108 minutes.

The resulting product is purified and analyzed in the manner described in Example 1, the results being as follows:

| | |
|---|---|
| overall yield percentage with respect to the feed | = 91.6 |
| nitrogen percentage | = 0.94 |
| percentage of the group -A-B- | = 10.15 |
| intrinsic viscosity (liters.g$^{-1}$) | = 2.07. |
| infrared spectrum analysis: under the qualitative | | aspect, the results described in Example 1 for the unstabilized copolymer D—A—B—D are obtained.

The copolymer D—A—B—D is acetylated in the manner described in Example 1, 97.6 parts stabilized product being obtained.

The analytical data of the stabilized copolymer D—A—B—D do not show appreciable variations of the intrinsic viscosity and of the contents of the group —A—B— with respect to the same copolymer D—A—B—D which had not been stabilized. The analysis of the infrared spectrum is similar to the corresponding analysis described in Example 1, the $K_{220}$ value being of 0.005%.

Further properties of the stabilized copolymer D—A—B—D after admixture of 0.2% pentaerythritol tetra(beta-4'—hydroxy-3',5'-di-tert-butylphenyl)propionate are summarized in Table 2.

EXAMPLE 3

This run is carried out similarly to that of Example 1 for preparing a stabilized D—A—B—D copolymer with a higher content of the group —A—B—.

More particularly, the following results are obtained:

| | |
|---|---|
| overall yield percentage with respect to the feed | = 83 |
| nitrogen percentage | = 0.6 |
| percentage of the group -A-B- | = 17.3 |
| intrinsic viscosity (liters.g$^{-1}$) | = 1.68 |
| $K_{220}$ | = 0.005%. |

Table 2 summarizes further properties of the stabilized copolymer D—A—B—D after admixture with the same additive as in Example 1.

Table 2

| | Ex.1 | Ex.2 | Ex.3 |
|---|---|---|---|
| Density (g/ml) | 1.426 | 1.393 | 1.364 |
| Impact strength Izod with notch Kgs.cm/sq.cm (ASTM D-256) | — | 16 | 14 |

Table 2-continued

|  | Ex.1 | Ex.2 | Ex.3 |
|---|---|---|---|
| Elongation % (ASTM D-638) | — | 90 | 90 |
| Tensile strength kgs/sq.cm (ASTM D-638) | — | 680 | 650 |
| Flammability mm/min (ASTM D-635) | — | 20 | 18 |

EXAMPLE 4

Preparation of the copolymer A—B 50 parts pure ε-caprolactam kept at 110°C while stirring and in an inert atmosphere are admixed with 0.2 part lithium metal in a finely subdivided condition. The metal lactam formation reaction is speedy; after 20 minutes, 50 parts ε-caprolactone are charged to the reactor and the mixture is heated to 150°C, thereby originating the copolymer A—B, the reaction being practically completed in 40 minutes.

The molten mass is extruded under strictly inert conditions into a reactor containing 400 parts pure anhydrous dimethyl acetamide at boiling temperature. Dissolving is easy if the whole is efficiently stirred.

The clear solution is cooled and simultaneously admixed with anhydrous toluene, thereby precipitating the copolymer A—B in fine powder form. Precipitation starts at about 80°C when the concentration of toluene in the mixture amounts to about 68%.

The copolymer is then purified in the cold by decanting with toluene so as to fully remove the dimethyl acetamide and the impurities present in the mass on completion of polymerization.

The final toluene suspension contains 12.2% of copolymer A—B.

The analysis gave the following results:

| | |
|---|---|
| % conversion of the monomers | = 94.8 |
| nitrogen percentage | = 5.85 |
| lactam percentage | = 47.2 |
| reduced viscosity (liters.g$^{-1}$) | = 0.81 |
| melting point (°C) | = 116–118 |
| grain size (moist) = | |
| > 88 microns : 0.8% | |
| 88–40 microns : 47.3% | |
| < 40 microns : 51.9% | |

Preparation of the copolymer D—A—B—D

Operating under strictly inert conditions, pure monomeric gaseous formaldehyde is introduced into the polymerization reactor containing 1,000 parts anhydrous benzene and 105 parts of the above described copolymer A—B. The rate of feed of the formaldehyde amounts to 2.5 parts per minute and feed is pursued during 80 minutes while the reaction temperature is maintained at 10°–15°C by a water and ice cooling bath. Practically no formaldehyde escapes during polymerization. Onn completion of addition of formaldehyde, the mass is stirred during 10 minutes, then filtered.

The recovered product is dried in an oven at 60°C and subatmospheric pressure then reflux extracted during 20 hours with anhydrous methanol in an Soxlhet extractor.

The anaylsis of the resulting copolymer D—A—B—D is:

| | |
|---|---|
| overall yield percentage with respect to the feed | = 83.5 |
| nitrogen percentage | = 2.12 |
| percentage of the group -A-B- | = 36.2 |
| intrinsic viscosity (liters.g$^{-1}$) | = 1.20 |
| analysis at the infrared spectrum: | | a band of the —OH group is noted at 3,460 cm$^{-1}$, a band of the —NH group at 3,300 cm$^{-1}$, a band of the lactonic C=O group at 1,730 cm$^{-1}$, a band of the lactamic C=O group at 1,640 cm$^{-1}$ with an accentuated absorption at 1,660–1,670 cm$^{-1}$. Moreover, bands relating to the oxymethylene chain are present at 4,425 cm$^{-1}$ and 2,020 cm$^{-1}$.

Stabilization of the copolymer D—A—B—D

Stabilization is effected by the reaction with acetic anhydride under the conditions described in Example 1, with a reaction yield amounting to 95.6%.

The further properties detected on the stabilized copolymer D—A—B—D are:

| | |
|---|---|
| intrinsic viscosity (liters.g$^{-1}$) | = 1.21 |
| nitrogen percentage | = 2.13 |
| percentage of the group -A-B- | = 36.4 |
| K$_{220}$ | = 0.009% |
| analysis of the infrared spectrum: | | the band relating to the —OH group disappears and the band relating to the acetyl group appears at 1,750 cm$^{-1}$ — calorimetric analysis:

the stabilized copolymer D—A—B—D is analysed by means of DTA and DSC in comparison with a blend of polyoxymethylene diacetate (molecular weight 30,000) with the previously described copolymer A—B.

The analysis of the thermograms disclosed a substantial difference between the blend and the stabilized copolymer D—A—B—D. The blend disclosed a melting peak relating to the polylactonic part, a peak relating to the polylactamic part and finally a further peak relating to the polyoxymethylene diacetate.

The stabilized copolymer D—A—B—D showed a single melting peak at 172.3°C.

The latent heat of fusion was of 31.0 cal/g for the blend (theoretical value 30.5 cal/g) and of 20.1 cal/g for the stabilized copolymer D—A—B—D.

EXAMPLE 5

45 parts of the copolymer A—B prepared as described in Example 4 are charged to the reactor containing 1,000 parts n-heptane. The stirred mass is admixed with gaseous monomeric formaldehyde at a rate of 2.5 parts per minute during 105 minutes, while the temperature is adjusted at 30°–35°C by means of a thermostated water bath. On completion of addition of formaldehyde, stirring is pursued during 10 minutes, the suspension is filtered and the resulting product is dried in an oven at 60°C and subatmospheric pressure, then extracted with methanol as in Example 4. The polymerization yield amounts to 91.6%, the resulting copolymer D—A—B—D having a nitrogen content of 0.86%, 14.7% group —A—B— and an intrinsic viscosity of 1.84 liters.g$^{-1}$.

The copolymer D—A—B—D is submitted to stabilization by reaction with acetic anhydride in the manner described in Example 1.

The reaction yield amounts to 97.2%, the stabilized polymer exhibiting no appreciable variations in viscosity and composition with respect to the unstabilized one.

The stabilized copolymer D—A—B—D is admixed with 0.3% 2,2'-methylenebis-(4-methyl-6-tert-butylphenol), the properties summarized in Table 3 being ascertained on the resulting composition.

Table 3

| | |
|---|---|
| Density (g/ml) | = 1.355 |
| Impact strength Izod with notch (kgs.cm/cm) | = 14 |
| Tensile strength (Kgs/sq.cm) | = 570 |
| Elongation (%) | = 110 |
| Flammability (mm/min) | = 19 |

EXAMPLE 6

Preparation of the copolymer A—B 41 parts pure α-pyrrolidone are admixed under inert conditions at 60°C, while stirring, with 0.48 part potassium metal.

The metal-lactam formation reaction is speedy, 100 parts anhydrous dimethyl acetamide being added at the end. The solution is heated to 35°C and 52 parts δ-valerolactone are added. These conditions are maintained during 5 hours, whereupon the solution is allowed to cool at room temperature while adding 700 parts toluene which cause the copolymer to precipitate in finely dispersed form. The suspension is thoroughly washed by decanting with toluene in order to thoroughly remove the reaction solvent and the further soluble substances present.

The resulting copolymer A—B shows the following properties:

| | |
|---|---|
| % conversion of the monomers | = 83 |
| nitrogen percentage | = 6.29 |
| lactam percentage | = 38.2 |
| reduced viscosity (liters.g$^{-1}$) | = 0.61 |
| melting point (°C) | = 159 |
| grain size distribution: | |
| > 88 microns : about 0.1% | |
| 88–40 microns : 65% | |
| < 40 microns : 34.9% | |

Preparation of the copolymer D—A—B—D 150 parts of the copolymer A—B are charged to a reactor containing 1,000 parts anhydrous toluene, in the absence of air and moisture.

The stirred mass is admixed with gaseous formaldehyde at a rate of 2.5 parts per minute during 60 minutes, the temperature being maintained between —5° and 0°C by circulating saline water in a thermostated bath.

On completion of addition of the formaldehyde, stirring is pursued during 10 minutes, whereupon the copolymer is filtered and dried, thoroughly washed with dimethylformamide at 35°–40°C in an anhydrous atmosphere, then with toluene and finally dried.

The analysis of the copolymer D—A—B—D shows:

| | |
|---|---|
| overall yield percentage with respect to the feed | = 83.5 |
| nitrogen percentage | = 3.07 |
| percentage of the group -A-B- | = 48.9 |
| inherent viscosity (liters.g$^{-1}$) | = 1.05 | pyrolytic gas chromatography:

in the pyrolysis gases (at about 530°C), the following substances were traced: α-pyrrolidone, δ-valerolactone, trioxane and tetraoxane (the latter forming by cyclization of formaldehyde under operational conditions). Formaldehyde does not appear in the chromatogram. The quantities of α-pyrrolidone and δ-valerolactone agree with those gathered from the elementary analysis.

— infrared spectrum analysis:

in the spectrum, the —OH band appears at 3,460 cm$^{-1}$, the band of the lactonic C=O at 1,730 cm$^{-1}$, the band of the lactamic C=O at 1,640 cm$^{-1}$ with a strong absorption at 1,660–1,670 cm$^{-1}$. Moreover, bands at 4,425 and 2,020 cm$^{-1}$ relating to the oxymethylene chains are present.

Stabilization of the copolymer D—A—B—D

Esterification is effected with acetic anhydride as in Example 1 with a reaction yield amounting to 96.6%. The stabilized copolymer D—A—B—D has a composition and a viscosity similar to that of the unstabilized one and the following further properties:

— $K_{220} = 0.01\%$
— infrared spectroscopic analysis: with respect to the unstabilized copolymer disappearance of the hydroxyl band and appearance of the acetyl band at 1,750 cm$^{-1}$ is ascertained.
— NMR analysis:

The copolymer is dissolved to a 20% concentration in deuterated dimethyl sulphoxide at 80°C.

Analysis of the spectrum shows the presence of the various polymeric blocks recognizable by the Chemical-Shifts of the different protonic groups of the lactamic, lactonic and formaldehyde part. A quantitative evaluation confirms the data of the elementary analysis.

EXAMPLE 7

15 parts of the copolymer A—B prepared as in Example 6 are charged to a reactor containing 1,000 parts toluene, under anhydrous conditions and in the absence of air, and admixed while stirring with gaseous pure anhydrous formaldehyde supplied at a rate of 2.5 parts per minute during 115 minutes, the temperature being maintained at 20°–25°C by means of a water bath.

Polymerization is speedy and thorough and the mass is stirred during 10 minutes after completion of the addition of formaldehyde, then filtered, dried in an oven at 60°C, thoroughly washed (as in Example 6) with dimethylformamide at 35°–40°C. The dimethylformamide is recovered and evaporated to dryness, a residue of two parts to 100 parts treated copolymer being obtained. The residue consists of formaldehyde, lactam and lactone.

Analysis of the copolymer D—A—B—D after washing with toluene and drying in an oven at 60°C discloses:

— overall yield percentage with respect to the feed = 97.5
— elementary analysis:
   carbon: 41.0%
   Hydrogen: 6.41%
   nitrogen: 0.31%

— percentage of the group —A—B— = 15.0
— intrinsic viscosity (liters.g$^{-1}$) = 1.54

The polymer D—A—B—D is stabilized by reacting 10 parts acetic anhydride and one part copolymer at 150°–152°C, during 30 minutes at a pressure allowing to keep boiling conditions. The copolymer dissolves in the reaction medium, forming a viscous solution which is cooled thereby precipitating the copolymer which is filtered, thoroughly washed with toluene and dried in a vacuum oven at 60°C.

The reaction yield amounts to 97.8%, no appreciable variations of the composition and viscosity being ascertained with respect to the unstabilized polymer.

The stabilized copolymer D—A—B—D, which has a $K_{220}$ value of 0.009%, is admixed with 0.2% 4,4'-butylidenebis-(6-tert-butyl-meta-cresol), the properties summarized in Table 4 being ascertained on the resulting composition.

Table 4

| | |
|---|---|
| Density (g/ml) | = 1.34 |
| Impact strength Izod with notch (Kgs.cm/sq.cm) | = 12 |
| Tensile strength (Kgs/sq.cm) | = 500 |
| Elongation (%) | = 95 |
| Flammability (mm/min) | = 20 |

EXAMPLE 8

Preparation of the copolymer A-B 110 parts ε-caprolactam at 110°C in an inert atmosphere are admixed with 0.21 part lithium metal in a finely subdivided condition. On completion of the reaction, which evolves hydrogen, 100 parts pure dimethyl sulphoxide, then 2.0 parts pivalolactone are added. Heating is then effected at 145°C and stirring during 4.5 hours, during which the solution increases in viscosity. This is followed by cooling and consequent precipitation of the copolymer in fine powder form.

The suspension is thoroughly washed by decanting with toluene, thereby removing any residue soluble in the polymerization medium and obtaining a toluene suspension. The analysis shows:

| | |
|---|---|
| % conversion of the monomer charge | = 97.4 |
| elementary analysis = | |
| carbon : 63.65% | |
| hydrogen : 9.75% | |
| nitrogen : 12.16% | |
| lactone percentage | = 1.18 |
| reduced viscosity (liters.g$^{-1}$) | = 1.35 |
| grain size distribution: | |
| > 88 microns : 0.5% | |
| 88–40 microns : 45.0% | |
| < 40 microns : 54.5% | |

Preparation of the copolymer D—A—B—D 270 parts of the said copolymer A—B in suspension are charged to a reactor containing 1,000 parts cyclohexane while operating under inert conditions. The whole is admixed while stirring with gaseous formaldehyde supplied at a rate of 2.5 parts per minute for 13 minutes, at 20°–25°C. On completion of introduction of formaldehyde, stirring is effected during 10 minutes, followed by filtering, washing and drying of the copolymer.

Stabilization of the copolymer D—A—B—D

Esterification is effected by means of 0.9 part triethyl orthoformate, 1,5 parts dimethyl acetamide and 3.1 parts of a mixture of $C_{10}$–$C_{14}$ n-paraffins to each part copolymer D—A—B—D, using as catalyst diethylsulphate in a proportion of 0.5% referred to the total of the liquid components.

The suspension is stirred at 128°–130°C during 10 minutes and finally cooled and filtered. After treatment of the copolymer with toluene containing 1% triethanolamine, a thorough washing is effected with dimethyl sulphoxide, the latter being removed by washing with acetone. After drying, a reaction yield of 96.4% is ascertained, the stabilized copolymer D—A—B—D exhibiting the following properties:

| | |
|---|---|
| elementary analysis = | |
| carbon : 61.70% | |
| hydrogen : 9.41% | |
| nitrogen : 11.21% | |
| % of the group -A-B- | = 92.2 |
| $K_{220}$ | = 0.004% |
| intrinsic viscosity (liters.g$^{-1}$) | = 1.13 |
| infrared spectroscopic analysis | = disappearance of the OH band. |

Further properties of the copolymer are summarized in Table 5.

EXAMPLE 9

Preparation of the copolymer A—B 20 parts pure α-pyrrolidone are admixed at 60°C with 0.11 part sodium metal in a 50% paraffin suspension, while stirring and under inert conditions.

A speedy reaction evolving hydrogen takes place, 80 parts anhydrous toluene being added at the end. The temperature is raised to 25°C and 80 parts pure ε-caprolactone are added while the temperature is adjusted at 25°–30°C.

After a few minutes, the formation of the copolymer in fine powder form is noted, and increases gradually with the progress of the reaction. After 5 hours, the suspension is diluted and thoroughly washed with toluene.

The analysis shows:

| | |
|---|---|
| % conversion of the monomers | = 70% |
| elementary analysis = | |
| carbon : 62.14% | |
| hydrogen : 8.70% | |
| nitrogen : 2.47% | |
| lactam percentage | = 15.0 |
| melting point (°C) | = 70–71 |
| reduced viscosity (liters.g$^{-1}$) | = 0.52 |
| grain size = | |
| > 88 microns : 1.0% | |
| 88–40 microns : 98.5% | |
| < 40 microns : 0.5% | |

Preparation of the copolymer D—A—B—D

The said copolymer A—B (264 parts) in suspension is charged to a reactor containing 1,000 parts cyclohexane. Pure gaseous monomeric formaldehyde is introduced while stirring at a rate of 2.5 parts per minute, during 15 minutes, the temperature being adjusted at −10°C by means of a saline water thermostating bath. On completion of the formaldehyde introduction, stirring is pursued during 10 minutes, followed by filtering.

The copolymer is dried, thoroughly washed with methanol and again dried.

The analysis gave following results:
— overall yield percentage with respect to the feed = 82.8

— elementary analysis:
  carbon: 59.50%
  hydrogen: 8.36%
  nitrogen: 2.17%
— inherent viscosity = 0.70 liters.g$^{-1}$
— infrared spectroscopic analysis:
the bands already noted with the other D—A—B—D copolymers are present and both the band of the lactonic C=O and the band at 1,660-1,670 cm$^{-1}$ are of increased intensity with respect to the band at 1,640 cm$^{-1}$ of the lactamic C=O.

Stabilization of the copolymer D—A—B—D

Etherification is effected by proceeding as described in Example 8, at a temperature of 110°–120°C during 20 minutes, the copolymer is thoroughly washed with toluene containing 1% triethanolamine, then dried with a reaction yield of 99.9%. The viscosity and composition of the stabilized copolymer are unaltered with respect to the unstabilized one. The results of further analyses are as follows:

— $K_{220}$ = 0.01%
— infrared spectroscopic analysis:
  disappearance of the —OH band is noted.
— the copolymer is submitted to hydrolysis with a caustic potash solution at 5% during 8 hours at 80°C. The polymeric residue is thoroughly washed with water and dried. The balance of the material lacks a quantity corresponding to the lactone content.

The polymeric residue is then fractionated in a column filled with Celite, the solvent employed being dimethyl sulphoxide and the temperature being programmed. 20 fractions are thus obtained, of which the first seven fractions after evaporation of the solvent have a nitrogen content of less than 0.01%. The eight and ninth fractions have a nitrogen content of 0.1 and 1.55%, respectively. The further fractions have a nitrogen content which is almost constant and amounts to 14.60%. The infrared spectrum of the last fractions shows the presence of the characteristic bands of the copolymer, with the exception of the lactonic C=O band.

Further properties of the copolymer are summarized in Table 5.

Table 5

|  | Ex.8 | Ex.9 |
|---|---|---|
| Density (g/ml) | 1.14 | 1.16 |
| Impact strength Izod with notch (Kgs.cm/sq.cm) | 18 | — |
| Tensile strength (Kgs/sq.cm.) | 700 | 330 |
| Elongation (%) | 150 | 250 |
| Coefficient of linear expansion m/m 10$^{-5.°C}$ | 10 | — |
| Moisture absorption (%) | 1.3 | — |
| Solubility in benzene | — | insoluble. |

We claim:

1. A block copolymer of the structure HO—D—A—B—D—H wherein:

A is a polylactonic block consisting of recurring units:

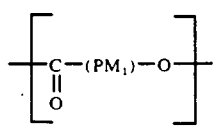

obtainable from at least one monomeric lactone of the formula:

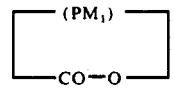

B is a polylactamic block consisting of recurring units:

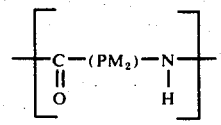

obtainable from at least one monomeric lactam of the formula:

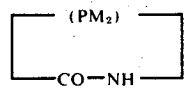

D is a polyoxymethylene block consisting of recurring units

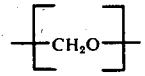

wherein $PM_1$ and $PM_2$ are linear polymethylene chains having from 2 to 13 and 3 to 13 carbon atoms, respectively, nonsubstituted or having at least one hydrogen atom replaced by a radical selected from the group consisting of alkyl, alkylaryl, aryl and cycloalkyl radicals; the said blocks D being present in a proportion of from 5 to 99.9% by weight in the said block copolymer, the group —A—B— having a molecular weight of from 1,000 to 50,000, and the block A being present in said group —A—B— in a proportion of from 1 to 89 percent by weight, said block copolymer HO—D—A—B'—D—H being formed by reacting a block copolymer A—B, wherein A and B are as defined above, with anhydrous monomeric formaldehyde, the copolymer A—B being from 1.9 to 89 percent by weight of the total weight of copolymer A—B and said formaldehyde.

2. The copolymer of claim 1, wherein the lactone is selected from the group consisting of ε-caprolactone, δ-valerolactone, β-propiolactone, pivalolactone and ω-enanthiolactone.

3. The copolymer of claim 1, wherein the lactam is selected from the group consisting of ε-caprolactam, α-pyrrolidone, ω-lauryllactam, α-piperidone and ω-enanthiolactam.

4. A method for preparing the block copolymer of claim 1, comprising the steps of:
— preparing at a first reaction stage a copolymer A-B by catalytic polymerization of at least one of the said lactams with at least one of the said lactones;
— purifying the resulting copolymer A—B; — preparing at a second reaction stage the copolymer HO—D—A—B—D—H by reacting the copolymer A-B with monomeric formaldehyde in a liquid medium.

5. The method of claim 4, wherein the first reaction stage is carried out in the presence of a catalyst consisting of a metal derivative of one of said lactams of the formula:

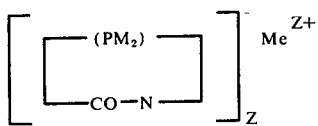

wherein Me is selected from in the group consisting of alkali and alkaline earth metals and Z is 1 or 2.

6. The method of claim 5, wherein the said catalyst is used in a proportion of from 0.1 to 10 moles for 100 moles starting monomers.

7. The method of claim 4, wherein the first reaction stage is carried out at a temperature from −30° to 300°C and during a period of from 1 minute to 10 hours.

8. The method of claim 4, wherein the first reaction stage is carried out in a solvent for the forming copolymer A—B, at a temperature from 0° to 200°C and during a period of from 5 minutes to 6 hours, the said solvent being selected from the group of organic substances which are liquid at the polymerization temperature, non-reactive towards the other constituents of the reaction medium and of polar nature.

9. The method of claim 4, wherein the first reaction stage is carried out in a diluent, at a temperature from −30° to 280°C and during a period of from 5 minutes to 10 hours, the said diluent being selected from the group of substances which are liquid and non-solvent for the copolymer A—B at the reaction temperature and non-reactive towards the other constituents of the reaction medium.

10. The method of claim 4, wherein the copolymer A—B is brought during said purification to a particulate form by precipitation.

11. The method of claim 9, wherein the purified copolymer A—B is suspended in a non-solvent and is contacted with monomeric formaldehyde at the second reaction stage at a temperature of from −70° to 100°C.

12. The method of claim 10, wherein the purified copolymer A—B is suspended in a non-solvent and is contacted with formaldehyde at the second reaction stage at a temperature of from −70° to 100°C.

13. The method of claim 4, wherein the purified copolymer A—B is dissolved in a solvent and is contacted with formaldehyde at the second reaction stage at a temperature of from −70° to 100°C.

14. The method of claim 4, wherein the copolymer HO—D—A—B—D—H obtained at the second reaction stage is stabilized by converting its terminal hydroxyl groups to terminal groups selected from the class consisting of ester, ether or urethane groups.

* * * * *